US006263648B1

(12) United States Patent
Carlson

(10) Patent No.: US 6,263,648 B1
(45) Date of Patent: Jul. 24, 2001

(54) LAWN TRACTOR COVER

(76) Inventor: Sheila Carlson, 69 Goodall Ave., Red Deer, Alberta (CA), T4P2R4

( * ) Notice: Subject to any disclaimer, the term of this patent is extended or adjusted under 35 U.S.C. 154(b) by 0 days.

(21) Appl. No.: 09/437,941

(22) Filed: Nov. 10, 1999

(51) Int. Cl.[7] ................................................. B60J 11/00
(52) U.S. Cl. ............................. 56/1; 296/136; 150/166
(58) Field of Search .................... 56/1, 320.1; 150/154, 150/166, 159; 296/136; 52/DIG. 14

(56) References Cited

U.S. PATENT DOCUMENTS

| 270,862 | * | 6/1883 | Turner ........................................ 56/1 |
| 311,542 | * | 2/1885 | Steward ..................................... 56/1 |
| D. 395,659 | | 6/1999 | Moiseve ................................. D15/17 |
| 753,071 | * | 2/1904 | Hertje ........................................ 56/1 |
| 1,584,518 | * | 5/1926 | Drake ..................................... 150/166 |
| 2,243,981 | * | 6/1941 | Rowan .................................... 150/166 |
| 2,311,514 | | 2/1943 | Bramblett . |
| 3,087,585 | | 4/1963 | Knuth et al. . |
| 3,815,650 | * | 6/1974 | Hickey ................................... 150/166 |
| 3,823,519 | * | 7/1974 | Cordova ........................... 52/DIG. 14 |
| 4,178,977 | | 12/1979 | Sur et al. ............................. 150/52 R |
| 4,693,289 | | 9/1987 | Taylor et al. ........................ 150/52 R |
| 4,850,635 | * | 7/1989 | Lindell .................................. 296/136 |
| 4,894,961 | * | 1/1990 | Robbins .......................... 52/DIG. 14 |
| 5,029,933 | * | 7/1991 | Gillem .................................... 150/166 |
| 5,390,479 | * | 2/1995 | Hutchison et al. ................... 56/11.3 |
| 5,472,257 | * | 12/1995 | Kaya ..................................... 150/166 |
| 5,820,196 | * | 10/1998 | Rudys et al. ......................... 150/166 |
| 5,845,958 | * | 12/1998 | Rudys et al. ......................... 150/166 |
| 6,099,067 | * | 8/2000 | Butterworth ......................... 296/136 |
| 6,129,408 | * | 10/2000 | Schultz et al. ....................... 296/136 |
| 6,141,891 | * | 11/2000 | Troccola .............................. 150/166 |

FOREIGN PATENT DOCUMENTS

3318881 * 11/1984 (DE) .
WO 91/06443 5/1991 (WO) .

OTHER PUBLICATIONS

Tuff Tarps, 8×10 tarp, web address:://209.238.71.189/html/tarps.html, pp. 1–2.*
Thor Tarp Lawn & Garden Tractor Covers, web address: www.thortarp.com, pp. 1–2.*

* cited by examiner

Primary Examiner—Robert E. Pezzuto
Assistant Examiner—Nathan Mammen
(74) Attorney, Agent, or Firm—Rudolf O. Siegesmund

(57) ABSTRACT

A lawn tractor cover assembly comprising a tractor cover and a deck cover wherein the deck cover is removably attached to the tractor cover and the tractor cover has an elasticized skirt for holding the lawn tractor cover assembly to the lawn tractor.

8 Claims, 2 Drawing Sheets

LAWN TRACTOR COVER

BACKGROUND OF THE INVENTION

1. Field of the Invention

The present invention relates to a removable, portable and foldable cover for a lawn tractor which can provide protection from the elements and which can also be deployed and stored easily.

2. Description of the Prior Art

Lawn tractors are relatively large units powered by internal combustion engines that are preferably stored indoors when not in use. However, indoor storage may not be available, especially due to the large size of the machine. Moreover, on large cutting tasks it may be desirable to leave the machine in position at the end of one day's work rather than returning the machine to a garage or storage shed. In both of these situations, a protective covering for the lawn tractor is desirable.

U.S. Pat. No. 2,311,514 to Bramblett issued Feb. 16, 1943 discloses a one piece folding cover for a farm tractor with zippers and spring catches for securing the cover to the tractor. U.S. Pat. No. 4,179,977 to Sur et. al. discloses a molded plastic cover in two interslidable halves for protecting a lawn mower. U.S. Pat. No. 3,087,585 to Knuth et. al. discloses a cover for a lawn mower with a handle on top of the cover for placing and removing the cover. Lawn tractors are larger than lawn mowers and have a seat for the operator who drives the tractor like a farm tractor or automobile. Lawn tractors are designed to mow large open areas and have a large cutting area which extends out to one side of the tractor.

A need exists for a cover which is specifically designed for a lawn tractor. Additionally, a further need exists for a cover for a lawn tractor which includes the deck portion of the lawn tractor where cutting extensions or blower attachments project out from the tractor.

SUMMARY OF THE INVENTION

The present invention meets the needs identified above by providing a lawn tractor cover assembly comprising a tractor cover and a deck cover wherein the deck cover is removably attached to the tractor cover and the tractor cover has an elasticized skirt for holding the lawn tractor cover assembly to the lawn tractor.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF PREFERRED EMBODIMENTS

Figure 1:
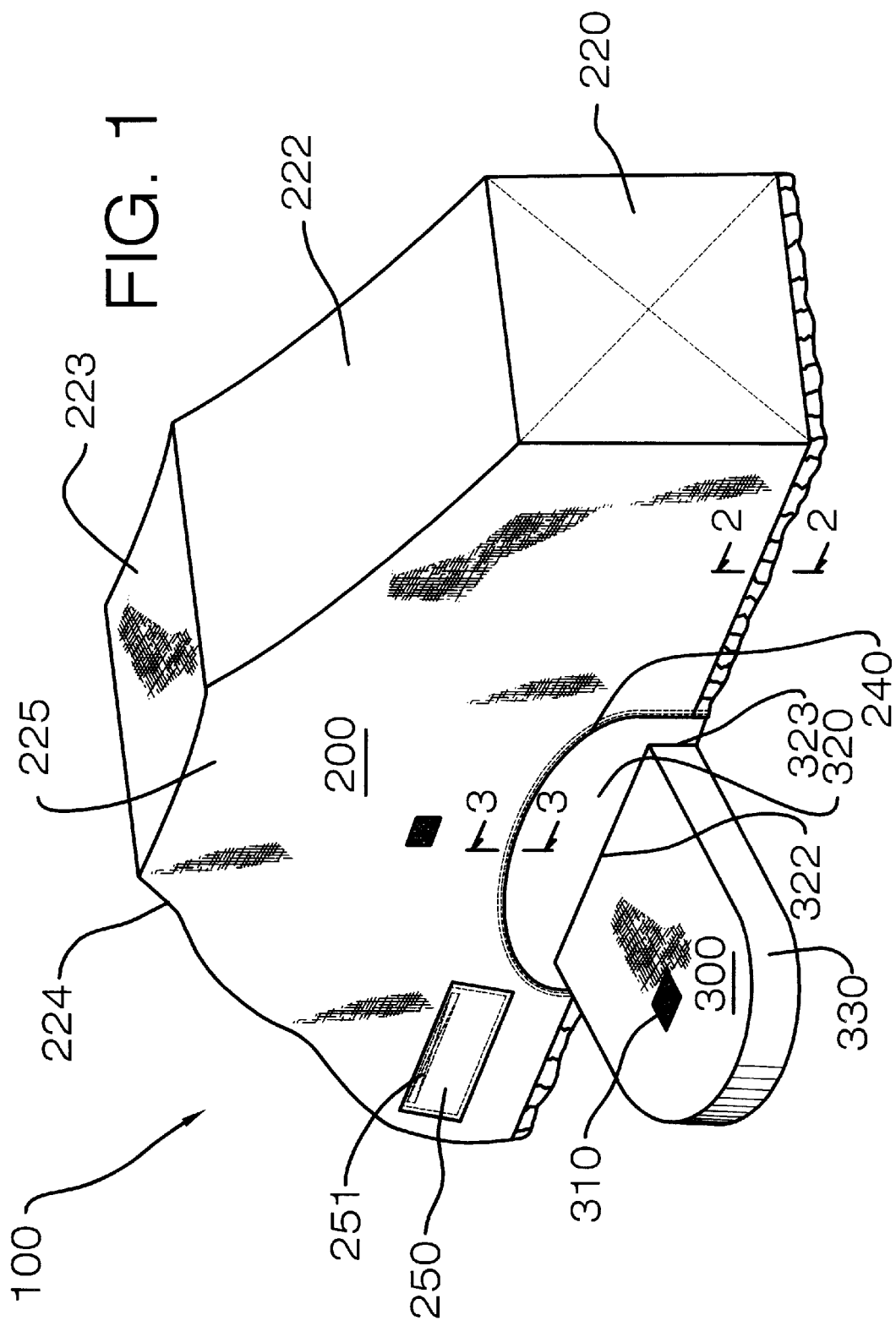
FIG. 1 is a side perspective of the lawn tractor cover.

In FIG. 1, cover assembly 100 is shown deployed over a lawn tractor. Cover assembly 100 has tractor cover 200 and deck cover 300. Deck cover 300 is removably engaged to tractor cover 200 by zipper 240. In the preferred embodiment, assembly 100 is made out of vinyl. However, any suitable material that is foldable and resistant to rain, snow, wind and sunlight can be used for assembly 100.

Tractor cover 200 has front face 220, front slope 222, top face 223, rear face 224 and deck side 225. The left side of tractor cover 200 (not shown) is like deck side 225 only there is no zipper 240 for attachment of deck cover 300. Skirt 230 surrounds tractor cover 200. In the preferred embodiment skirt 230 is elasticized to draw in skirt 230 and hold tractor cover 200 to the lawn tractor (not shown). The term pad as used herein shall include all variations of hook and loop fasteners including VELCRO ® releasable hook and loop fastening strips. VELCRO ® is a registered trademark of Velcro USA, Inc. Persons skilled in the art will be aware of a variety of securement devices that can accomplish the same end as deck cover pad 310 and tractor cover pad 210.

Tractor cover 200 has pocket cover 250 attached to tractor cover 200 by stitching. Pocket cover 250 has pocket cover opening 251 for access to the space between pocket cover 250 and tractor cover 200. Deck cover 300 can be removed from tractor cover 200 by undoing zipper 240 and removing deck cover 300. Deck cover 300 can then be folded and placed inside the space between pocket cover 250 and tractor cover 200 by inserting folded deck cover 300 through pocket cover opening 251. Alternatively, deck cover 300 can be left zipped to tractor cover 200 by zipper 240 and folded upward so that deck cover pad 310 comes in contact with tractor cover pad 210 thereby holding deck cover 300 up against deck side 225 of tractor cover 200.

Deck cover 300 has tractor cover interface section 320, deck cover top 322 and deck cover wall 330. Deck cover top 322 joins tractor cover interface section 320 at top seam 322. Deck cover wall 330 joins tractor cover interface section 320 at first wall seam 323 and at an identical second wall seam (not shown).

Figure 2:
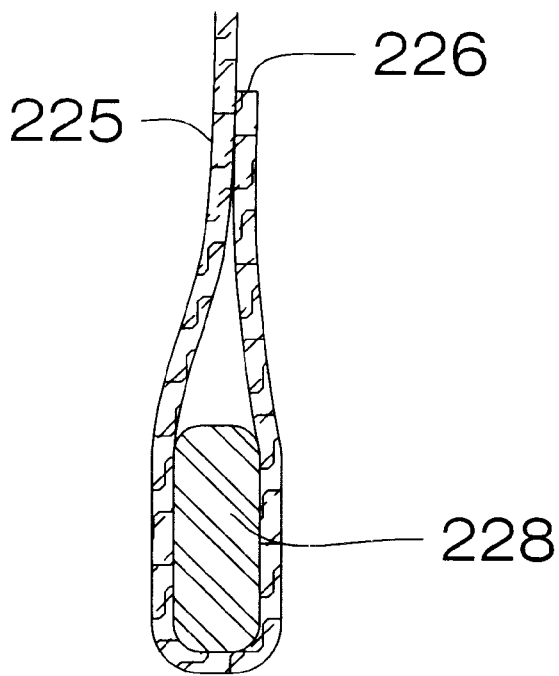
FIG. 2 is a cross sectional view along line 2—2 in FIG. 1.

FIG. 2 shows a cross sectional view of deck side 225 along line 2—2 of FIG. 1. Deck side 225 extends downward and then turns inward around elastic member 228 and upward around elastic member 228 until deck side free edge 226 is fixedly engaged to the inside of deck side 225.

Figure 3:
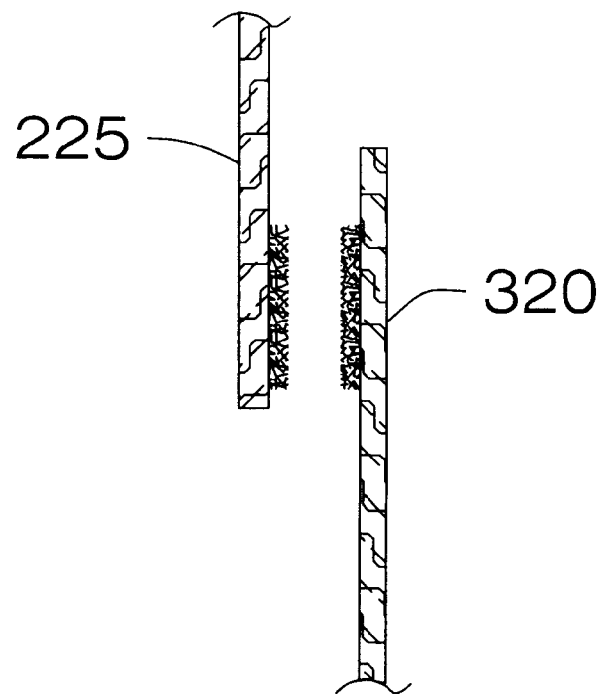
FIG. 3 is a cross sectional view along line 3—3 in FIG. 1.

FIG. 3 depicts an alternative embodiment along line 3—3 of FIG. 1. Instead of zipper 240 to engage tractor cover interface section 320 and deck side 225 of tractor cover 200, FIG. 3 shows pads used to join deck side 225 and tractor cover interface section 320.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An apparatus for covering a lawn tractor having an operator seat section, an engine section and a mower deck section comprising:

a tractor cover adapted for removable engagement with said operator seat section and said engine;

a first securement device fixedly engaged to said tractor cover;

a deck cover adapted for removable engagement with said mower deck section;

a tractor cover interface section fixedly engaged to said deck cover; and a second securement device fixedly engaged to said tractor cover interface;

wherein said tractor cover interface section is removably engaged to said tractor cover by engagement of said first securement device and said second securement device.

2. The tractor cover of claim 1 further comprising an elasticized skirt attached to said tractor cover.

3. The tractor cover of claim 1 further comprising a deck cover pocket attached to said tractor cover and adapted for receiving said deck cover and said tractor cover interface.

4. The apparatus of claim 1 further comprising a first pad on said tractor cover and a second pad on said deck cover, wherein, said deck cover can be raised so that said second pad engages said first pad holding said deck cover in an upright position against said tractor cover.

5. An apparatus for covering a lawn tractor having an operator seat section, an engine section and a mower deck section comprising:
   a tractor cover comprising;
      a first securement device fixedly engaged to said tractor cover;
      an elasticized skirt fixedly engaged to said tractor cover;
   a deck cover comprising;
      a tractor cover interface section fixedly engaged to said deck cover and a second securement device fixedly engaged to said tractor cover interface section;

wherein said tractor cover is adapted for removable engagement with said operator seat section and said engine section;

wherein said deck cover is adapted for removable engagement with said mower deck section;

wherein said deck cover has a deck cover top affixed to a deck cover wall;

wherein said tractor cover interface section is affixed to said deck cover top by a top seam and to said deck cover wall by a first wall seam and a second wall seam; and wherein said tractor cover interface section is removably engaged to said tractor cover by engagement of said first securement device and said second securement device.

6. The tractor cover of claim 5 further comprising a deck cover pocket attached to said tractor cover.

7. The apparatus of claim 5 further comprising a first pad on said tractor cover and a second pad on said deck cover, wherein, said deck cover can be raised so that said second pad engages said first pad holding said deck cover in an upright position against said tractor cover.

8. An apparatus for covering a lawn tractor having an operator seat section, an engine section and a mower deck section comprising:
   a tractor cover comprising;
      a front face, a front slope, a top face and a rear face each of which are affixed to a first side and a second side;
      a first securement device fixedly engaged to said tractor cover;
      an elasticized skirt fixedly engaged to said tractor cover;
      a first pad on said tractor cover;
   a deck cover comprising;
      a deck cover top affixed to a deck cover wall;
      a tractor cover interface section fixedly engaged to said deck cover and a second securement device fixedly engaged to said tractor cover interface section;
      a deck cover pocket;
      a second pad;

wherein said tractor cover is adapted for removable engagement with said operator seat section and said engine section;

wherein said deck cover is adapted for removable engagement with said mower deck section;

wherein said tractor cover interface section is affixed to said deck cover top by a top seam and to said deck cover wall by a first wall seam and a second wall seam;

wherein, said deck cover can be raised so that said second pad engages said first pad holding said deck cover in an upright position against said tractor cover.

* * * * *